United States Patent
Ozaki

(10) Patent No.: US 8,305,698 B2
(45) Date of Patent: Nov. 6, 2012

(54) IMAGING LENS, IMAGING DEVICE, AND PORTABLE TERMINAL

(75) Inventor: Yuichi Ozaki, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 246 days.

(21) Appl. No.: 12/745,348

(22) PCT Filed: Nov. 12, 2008

(86) PCT No.: PCT/JP2008/070567
§ 371 (c)(1),
(2), (4) Date: May 28, 2010

(87) PCT Pub. No.: WO2009/069467
PCT Pub. Date: Jun. 4, 2009

(65) Prior Publication Data
US 2010/0302652 A1    Dec. 2, 2010

(30) Foreign Application Priority Data

Nov. 29, 2007    (JP) ................................. 2007-308770

(51) Int. Cl.
*G02B 3/02*    (2006.01)
*G02B 27/02*    (2006.01)
(52) U.S. Cl. ......... 359/718; 359/719; 359/796; 359/797
(58) Field of Classification Search .................. 359/718, 359/719, 796, 797
See application file for complete search history.

(56) References Cited

U.S. PATENT DOCUMENTS

| 7,342,731 | B2 | 3/2008 | Lee et al. |
| 7,457,053 | B2 * | 11/2008 | Oh et al. ........................ 359/793 |
| 7,656,593 | B2 | 2/2010 | Do |
| 7,830,619 | B2 | 11/2010 | Do |
| 7,880,981 | B2 | 2/2011 | Do |
| 8,014,083 | B2 | 9/2011 | Do |
| 8,149,525 | B2 | 4/2012 | Do |

FOREIGN PATENT DOCUMENTS

| JP | 2006-10990 | 1/2006 |
| JP | 2006-323365 | 11/2006 |
| JP | 2007-10750 | 1/2007 |
| JP | 3926380 | 3/2007 |
| JP | 3946245 | 4/2007 |
| JP | 3976780 | 6/2007 |
| JP | 3976782 | 6/2007 |
| JP | 4022246 | 10/2007 |
| JP | 2008-233884 | 10/2008 |

* cited by examiner

*Primary Examiner* — Evelyn A. Lester
(74) *Attorney, Agent, or Firm* — Cozen O'Connor

(57) ABSTRACT

An imaging lens good in mass-productivity, compact, low in manufacturing cost, good in aberration performance is provided by effectively correcting aberrations without greatly varying the variation of the thickness of a curing resin. An imaging device having such an imaging lens and a portable terminal are also provided. A third lens (L3) has a flat surface on the object side, a convex surface near the optical axis on the image side, and a concave aspheric surface around the peripheral portion within the region where a light beam passes. Therefore, it is possible to reduce the other optical aberrations such as distortion and simultaneously to design the imaging lens so that the astigmatism takes on a maximum value at the outermost portion. Hence, the resolutions at low to middle image heights are high. In addition, such a shape does not cause a large variation of the thickness of the third lens (L3) from the region along the axis to the periphery. Therefore, the thickness of the third lens (L3) can be small, and the material cost can be reduced.

8 Claims, 13 Drawing Sheets

FIG. 6
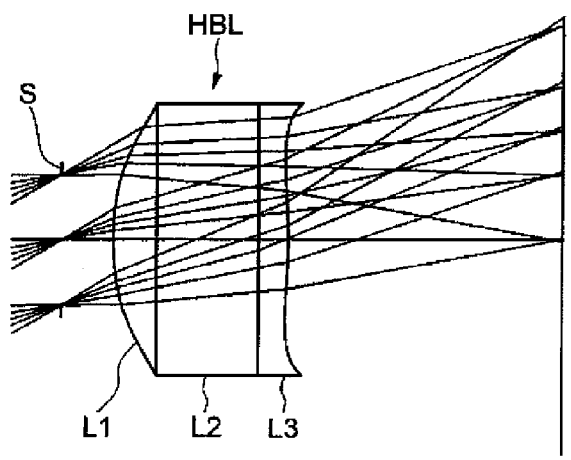
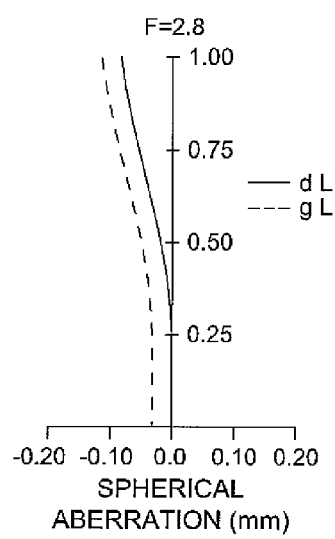
FIG. 7a
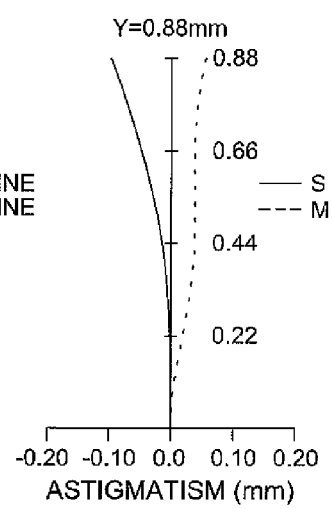
FIG. 7b
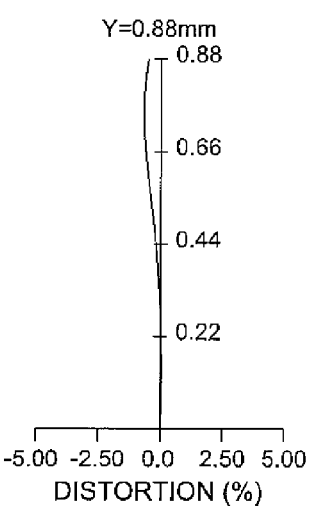
FIG. 7c

MERIDIONAL COMA-ABERRATION (mm)   SAGITAL COMA-ABERRATION (mm)

MERIDIONAL COMA-ABERRATION (mm)   SAGITAL COMA-ABERRATION (mm)

IMAGING LENS, IMAGING DEVICE, AND PORTABLE TERMINAL

RELATED APPLICATIONS

This is a U.S. National Phase Application under 35 U.S.C. 371 of International Application PCT/JP2008/070567, filed on Nov. 12, 2008.

This application claims the priority of Japanese Application No. 2007-308770 filed on Nov. 29, 2007, the entire content of which is hereby incorporated by reference.

FIELD OF THE INVENTION

The present invention relates to an imaging lens of an imaging device using a solid image pickup element such as a CCD (Charge Coupled Device) type image sensor and CMOS (Complementary Metal Oxide Semiconductor) type image sensor, particularly to an imaging lens using a lens suited for mass production, and an imaging device and portable terminal using this imaging lens.

BACKGROUND

At present, the portable terminal such as a cellular mobile telephone and PDA (Personal Digital Assistant) is provided with a compact imaging device. With the widespread use of portable terminals in recent years, there has been an intense demand for high-volume production of imaging devices. To meet the users' demands for more compact and slim configuration, imaging devices are required to be smaller and less expensive.

In a recently proposed technique of producing low-cost and high-volume imaging devices, an IC chip and other electronic parts, and optical element mounted on the substrate with solder potted therein in advance are subjected to reflow processing (process of heating), and the solder is melted, whereby the electronic parts and optical element are simultaneously mounted on the substrate.

In another proposal, an aspherical and double-convex single lens characterized by low cost and high precision is used as an imaging lens to meet the demand for a more compact and less expensive imaging device.

However, mounting of components using the aforementioned reflow processing requires the electronic parts and optical element to be heated up to about 200 through 260 degrees Celsius. Then the plastic lens is deformed or discolored under such a high temperature, with the result that optical performance is deteriorated. To solve this problem, a heat resistant glass mold lens is used. This ensures the optical performance to be maintained despite exposure to high temperature during the reflow process. However, this lens is more expensive than the plastic lens, and hence, a requirement for a lower-cost imaging device cannot be satisfied.

To solve these problems, a technique has already been proposed. This technique ensures both the low cost and optical performance under high-temperature environment, using the cemented lens formed by the curing resin bonded on the surface of a glass substrate having a smaller coefficient of thermal expansion. Patent Literature 1 discloses an imaging lens using one cemented lens produced according to this technique.

Patent Literature 1: Specification, U.S. Pat. No. 3,926,380

DISCLOSURE OF INVENTION

Problems to be Solved by the Invention

From the viewpoint of the processability and sensitivity to eccentric error of the lens, the glass material for bonding the curing resin is preferably formed of a parallel flat plate. In the meantime, when the parallel flat plate is used, the glass material per se cannot be provided with the optical performance as a lens. Further, as shown in Patent Literature 1, another problem is that for the very nature of the cemented type composite lens wherein a curing resin is bonded on the surface of the parallel flat plate of glass, it is difficult to produce a large change in the configuration of the lens surface between the area close to the axis and periphery.

These problems have interfered with development of a composite type double convex single lens which is formed by bonding the curing resins onto both surfaces of the flat plate, and which has a sufficient optical performance for use with the imaging device. For example, the Patent Literature 1 shows Examples 1, 3 and 4 wherein the aforementioned composite double convex single lens is used. In these Examples, a great astigmatism is found in the range from the low through intermediate image heights. This suggests that the resolution close to the image center is lower. A sufficient performance cannot be said to be achieved when used in an imaging device.

In view of the problems described above, it is an object of the present invention to provide an imaging lens characterized by excellent aberration performances, high-volume production, compact configuration and reduced cost, and an imaging device and portable terminal provided with this imaging lens, by effective correction of aberration without causing much fluctuation in the thickness of a curing resin.

Means for Solving the Problems

The imaging lens described in Claim 1 is provided with at least an aperture stop and a junction type compound lens wherein: a lens located on a side closest to an object is the junction type compound lens; the junction type compound lens comprising a first lens, a second and a third lens arranged in that order in a direction from the object side towards an image side; the second lens has both the surfaces on the object side and on the image side being made of flat-glass parallel plates; the first and third lenses are formed of curing resin; the first and second lenses are directly or indirectly bonded, the second and third lenses being also directly or indirectly bonded; the first lens is a piano-convex lens wherein the surface on the object side is a convex aspherical surface and the surface on the image side is a plane surface; and the third lens is aspherical in such a way that the surface on the object side is plane, while the surface thereof on the image side is convex at the position close to the optical axis and is concave on the periphery within the passing range of a light flux.

The present invention uses the junction type compound lens formed by bonding the first and third lenses of curing resin onto both surfaces of the second lens as a parallel flat plate made of glass. Thus, a reduction in optical performances is smaller than that of the plastic lens when exposed to high temperature. This arrangement is more effective in reflow processing, and ensures compatibility between the reduced cost and high-volume production of the imaging device incorporating the imaging lens of the present invention. Further, the third lens is aspherical in such a way that the surface on the object side is plane, while the surface thereof on the image side is convex at the position dose to the optical axis and is concave on the periphery within the passing range of a light flux. While reducing other optical aberrations such as distortion, this arrangement allows the portion of the maximum astigmatism to be shifted to the periphery, and increases resolution in the range from the low through intermediate image heights. In addition, this arrangement ensures that the thickness of the third lens does not exhibit much change from the on-axis position to the periphery, with the result that the thickness of the third lens per se can be reduced, and hence a reduction in material cost can be achieved. It should be noted that "curing resin" includes both the thermosetting resin and UV curable resin. For example, the thermosetting resins and UV curable resins such as silicone resin KER Series of Shin-Etsu Chemical Co. Ltd. can be employed.

Further, inorganic fine particles having a size of 30 nm or less can be dispersed in the first and third lenses made of resin material. This arrangement reduces the performance deterioration and fluctuation of the image point despite temperature change, and provides an imaging lens characterized by superb optical performances, independently of environmental variations, without the light transmittance being reduced.

Generally, when particles are blended with the transparent resin material, light-scattering occurs and transmittance is reduced. This makes it difficult to use this resin material as an optical material, according to the conventional art. However, substantial elimination of light scattering can be achieved by making the size of the particles smaller than the wavelength of the transmitted light flux.

Further, the resin material has a refractive index lower than that of the glass material. To solve this problem, inorganic particles of high refractive index are dispersed in the resin material as a base material. This arrangement has been known to increase the refractive index. To put it more specifically, inorganic particles having a size of 30 nm or less are dispersed in the resin material as a base material, preferably inorganic particles having a size of 20 nm or less, more preferably, 15 nm or less are dispersed in the resin material as a base material. This provides the material having a desired temperature dependency.

The refractive index of the resin material is reduced by temperature rise. The inorganic particles having the refractive index being increased by temperature rise are dispersed in the resin material as a base material. This arrangement allows these properties to offset each other, and is known to reduce a change in refractive index with respect to temperature fluctuation. Conversely, the inorganic particles having the refractive index being decreased by temperature rise are dispersed in the resin material as a base material. This arrangement is known to increase a change in refractive index with respect to temperature fluctuation. To put it more specifically, inorganic particles having a size of 30 nm or less are dispersed in the resin material as a base material, preferably inorganic particles having a size of 20 nm or less, more preferably, 15 nm or less are dispersed in the resin material as a base material. This provides the material having a desired temperature dependency.

For example, the particles of aluminum oxide ($Al_2O_3$) and lithium niobate ($LiNbO_3$) are dispersed in acrylic resin. This provides a resin material of high refractive index, characterized by reduced changes in refractive index with respect to temperature fluctuation.

The following describes the temperature fluctuation A of the refractive index. The temperature fluctuation A of the refractive index is expressed by the following formula [Mathematical Formula 1] by differentiation of the refractive index n with respect to temperature t based on the Lorentz-Lorentz equation:

$$\frac{dn}{dt} = \frac{(n^2+2)(n^2-1)}{6n}\left\{(-3\alpha) + \frac{1}{[R]}\frac{\partial[R]}{\partial t}\right\}$$ [Mathematical Formula 1]

wherein "$\alpha$" denotes a coefficient of linear expansion, and [R] represents a molecular refraction.

In the case of a resin material, the contribution of the second term is generally smaller than that of the first term of the formula, and the second term can be ignored. For example, in the case of PMMA resin (polymethyl methacrylate), the coefficient of linear expansion $\alpha$ is $7\times10^{-5}$. When this is substituted into the aforementioned formula, $dn/dt = 1.2\times10^{-4}$ [/° C.]] is obtained. This exhibits approximate conformance to the actual measurement.

In this case, the particles, preferably the inorganic particles are dispersed in the resin material, thereby increasing the contribution of the second term in the aforementioned formula so as to mutually cancel out the change by the linear expansion of the first term.

To put it more specifically, the change of about $-1.2\times10^{-4}$ in the conventional method is preferably kept below $8\times10^{-5}$ in terms of absolute value.

It is also possible to further increase the contribution of the second term so that to provide the temperature characteristic reverse to that of the base resin material. To be more specific, it is possible to get a material whose refractive index is increased, instead of the refractive index being reduced by temperature rise. Similarly, the refractive index of the resin material is increased by absorption of water. Conversely, it is possible to get the material whose refractive index is reduced.

The blending ratio can be adjusted as appropriate to control percentage of the refractive index with respect to temperature. A plurality of nanometer sizes of inorganic particles can be blended and dispersed.

The first and third lenses can be bonded onto the second lens by either direct bonding of the curing resin or indirect bonding of the curing resin through other curing resins (adhesives). Any of these methods can be used. Direct bonding of the curing resin to be a lens is particularly preferred because the adverse effect on the optical performances can be reduced, and the cost by simple manufacturing can also be reduced. To put it more specifically, in the direct bonding, the first and third lenses are formed on the second lens by insert molding so that the molding material can be used as an adhesive. In indirection bonding, the first and third lenses are separately molded and are bonded to the second lens by the adhesive. It should be noted that the second lens can serve the functions of an optical low-pass filter or IR cut filter.

The imaging lens described in Claim 2 is the same as the Claim 1, wherein the following conditional expression is satisfied:

$$f_1/f_3 < 1.2 \quad (1)$$

wherein $f_1$ indicates the focal distance of the first lens and $f_3$ denotes the focal distance of the third lens.

In the Claim 2, the ratio of the focal distance between the first and third lenses is defined. When the expression (1) is met, the power of the first lens is increased and the principal point moves forward, whereby the overall optical length can be reduced. Further, when the lower limit of the conditional expression (1) is to be defined, $0.1 < f_1/f_3$ is preferred. If the power of the first lens is increased, the light flux is made smaller and passes through a different site for each image height. Effective correction of the aberration can be ensured by the aspherical surface. Further when the following conditional expression (1')

$$0.1 < f_1/f_3 < 0.7 \quad (1)$$

is satisfied, compatibility between the tolerance of the mounting error and optical performances is ensured. This provides a more preferred result.

The imaging lens described in Claim 3 is the same as the Claim 1 or 2, wherein the following conditional expression is satisfied:

$$0.1 \leq S/f \leq 0.3 \quad (2)$$

wherein S is the distance between the surface of the second lens on the object side and the aperture stop, and f is the focal distance of the entire imaging lens system.

In the Claim 3, the distance between the second lens as a parallel plate and the aperture stop is defined. When the S/f is defined as below the upper limit of the conditional expression (2), an increase in the overall optical length can be reduced. When the S/f is defined as above the lower limit of the conditional expression (2), an increase in the distance between the aperture stop and junction type compound lens provides easy passage of the light flux through the site different for each image height with respect to the surface of the first lens on the object side. Thus, use of the aspherical surface ensures effective correction of the aberration. Further, the following conditional expression (2')

$$0.1 \leq S/f \leq 0.27 \quad (2')$$

is more preferably satisfied.

The imaging lens described in Claim 4 is the same as that described in any one of the Claims 1 through 3, wherein the following conditional expression is satisfied:

$$v_1 > v_3 \quad (3)$$

wherein $v_1$ is the Abbe's number of d-line of the first lens, and $v_3$ is the Abbe's number of d-line of the third lens.

The Claim 4 defines the imaging lens including the first and third lens made of different materials. To put it more specifically, meeting the conditional expression (3) indicates use of the resin having a degree of dispersion higher than that of the first lens to the third lens, whereby off-axis color aberration is corrected. Further, the third lens is convex in the vicinity of the optical axis, and this tends to increase the on-axis color aberration. However, especially when the conditional expression (1) is met, the power of the third lens can be reduced to a relatively small level. This provides effective correction of the off-axis color aberration and suppresses an increase in on-axis color aberration.

The imaging lens described in Claim 5 is the same as that described in any one of the Claims 1 through 4, wherein this imaging lens is made up of the aperture stop and junction type compound lens alone.

The imaging lens described in Claim 6 is the same as that described in any one of the Claims 1 through 5, wherein the junction type compound lens is manufactured by mounting a plurality of sets of the first and third lenses on a glass-made parallel flat plate material and cutting the same into each set.

For example, a mold can be used to produce at least one of the first and third lenses in great numbers in one molding operation with respect to the large parallel flat plate material, cutting the same into each set afterwards, whereby high-volume production and reduced cost can be achieved. In the case of UV curable resin, ultraviolet rays is applied from outside to cure the resin. If the thickness of the resin is increased too much, the ultraviolet rays will be absorbed and the interior of the resin is not cured easily. However, such a restriction is minimized by the arrangement wherein the third lens is aspherical in such a way that the surface on the image side is convex at the position close to the optical axis and is concave on the periphery within the passing range of a light flux. Thus, the third lens can be made relatively thin, without causing much change in the thickness of the third lens.

The imaging device described in Claim 7 includes:
the imaging lens described in any one of the Claims 1 through 6; and
a solid image pickup element that converts into electric signals the subject image formed by the imaging lens.

The imaging device described in Claim 8 is the same as that described in Claim 7, wherein the imaging device has a parallel flat plate element between the imaging lens and solid image pickup element, and the following conditional expression is satisfied:

$$0 < d_c/f \leq 0.7 \quad (4)$$

wherein $d_c$ is a thickness of the parallel flat plate element and f is a focal distance of the entire imaging lens system.

In the imaging device, Claim 8 defines ratio between the thickness of the parallel flat plate element and the focal distance when the parallel flat plate element is provided closest to the image side. The imaging device using a solid image pickup element such as a CCD image sensor and CMOS image sensor is often provided with the parallel flat plate element immediate before the solid image pickup element, for the purpose of providing a function of the sensor cover and infrared preventive filter. If the conditional expression (4) can be met for the parallel flat plate element, the curvature of the image surface can be corrected while an increase in aspherical surface is suppressed. Further, the following conditional expression (4)

$$0.2 < dc/f \leq 0.7 \quad (4)$$

is more preferably satisfied.

A portable terminal includes an imaging device as in items 7 or 8.

Effects of the Invention

As described above, the present invention provides an imaging lens characterized by excellent aberration performances, high-volume production, compact configuration and reduced cost, and an imaging device and portable terminal provided with this imaging lens.

BRIEF DESCRIPTION OF THE DRAWINGS

FIG. 6 is a cross section of a first Example;

FIG. 7 is an aberration diagram representing the spherical aberration (a), astigmatism (b) and distortion (c) of the imaging lens in the first Example;

DESCRIPTION OF REFERENCE NUMERALS

Figure 1:
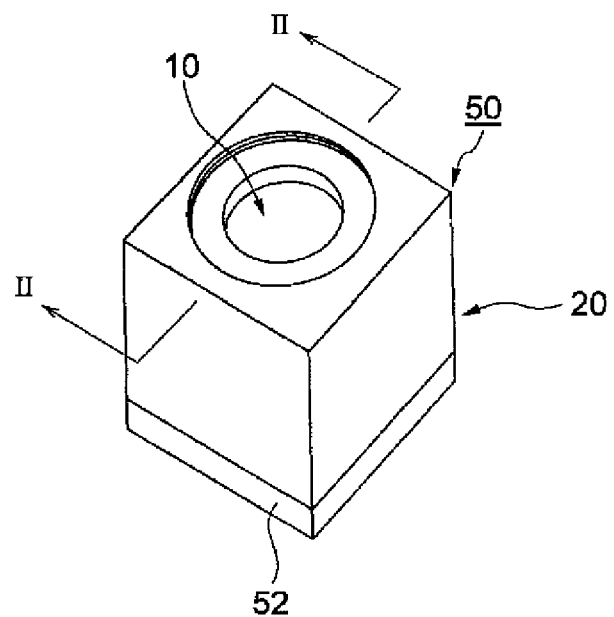
FIG. 1 is a perspective view of an imaging device 50 in an embodiment of the present invention.

10. Imaging lens
20. Enclosure
20$a$. Flange section
20$b$, 20$c$. Shoulder
21. Cover member
23. Light shield member
50. Imaging device
51. Image sensor
51$a$. Photoelectric conversion section
51$b$. Signal processing circuit
52. Substrate
52$a$. Support flat plate
60. Input section
70. Display section
80. Radio communication section
92. Memory section
100. Cellular mobile telephone
101. Control section
B. Adhesive
BT. Button
CG. IR cut filter
L1 through L3. Lenses
HBL. Junction type compound lens

BEST FORM OF EMBODIMENT OF THE PRESENT INVENTION

Figure 2:
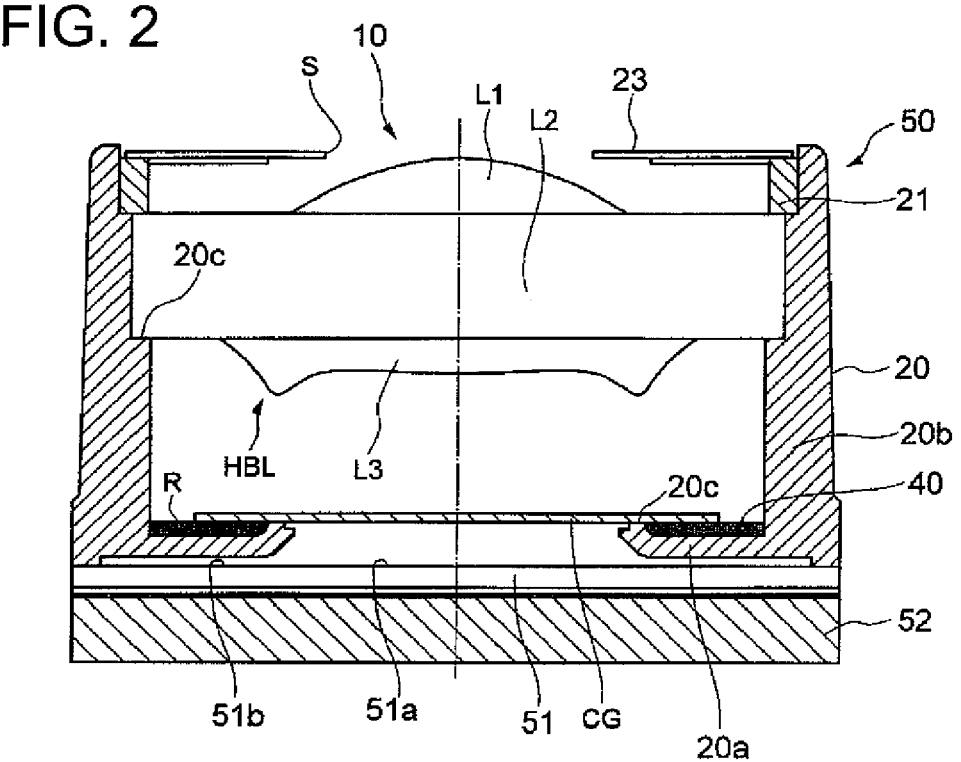
FIG. 2 is a cross section taken along arrow line II-II of the structure of FIG. 1, as viewed from the arrow direction.

The following describes the embodiment of the present invention with reference to drawings:

FIG. 1 is a perspective view of an imaging device 50 in an embodiment of the present invention. FIG. 2 is a cross section taken along arrow line II-II of the structure of FIG. 1, as viewed from the arrow direction. As shown in FIG. 2, the imaging device 50 includes:

a CMOS image sensor 51 as a solid image pickup element having a photoelectric conversion section 51$a$;

an imaging lens 10 as an imaging lens for allowing a subject image to be captured by the photoelectric conversion section 51$a$ of the CMOS image sensor 51;

an IR cut filter CG as a parallel flat plate element arranged between the image sensor 51 and imaging lens 10; and a substrate 52 having an external connection terminal (not illustrated) for holding the image sensor 51 and for sending and receiving the electric signal thereof;

wherein these components are formed in an integral unit.

At the center of the plane surface of the light receiving side of the image sensor 51 is provided the photoelectric conversion section 51$a$ as a light receiving section wherein pixels (photoelectric conversion elements) are arranged in a two-dimensional array. A signal processing circuit 51$b$ is formed on the periphery thereof. The signal processing circuit 51$b$ includes:

a drive circuit section that sequentially drives the pixels to get signal charges;

an analog-to-digital conversion section for converting the signal charges into digital signals; and a signal processing section for forming an image signal output using this digital signal.

Further, a great number of pads are arranged in the vicinity of the outer edge of the plane surface on the light receiving side of the image sensor 51, and are connected to the substrate 52 through a wire (not illustrated). The image sensor 51 converts the signal charges from the photoelectric conversion section 51$a$ into image signals such as digital YUV signals, and outputs these signals to a prescribed circuit on the substrate 52 through the wire (not illustrated). In this case, Y is a brightness signal, U(=R−Y) is a color difference signal between the red and brightness signal, and V (=B−Y) is a color difference signal between the blue and brightness signal. The solid image pickup element is not restricted to the aforementioned CMOS image sensor. Other elements such as a CCD can be used.

The substrate 52 wherein the bottom end of the enclosure 20 is mounted includes a great number of signal transmission pads mounted on the surface, and these pads are connected to the wire leading from the image sensor 51.

The substrate 52 is connected through the external connection terminal (not illustrated) to an external circuit (such as the control circuit of the high-order apparatus of the portable terminal mounted with the imaging device). The substrate 52 receives from the external circuit the voltage and clock signal for driving the image sensor 51. The substrate 52 also permits the digital YUV signal to be outputted to the external circuit.

The enclosure 20 formed of the light shield member is shaped like a rectangular sleeve. The bottom end is bonded onto the image sensor 51 with an adhesive so as to encircle the photoelectric conversion section 51$a$ and signal processing circuit 51$b$. The enclosure 20, together with the imaging lens 10, passes through the reflow reservoir (not illustrated), whereby the enclosure 20 is fixed onto the substrate 52 as the image sensor 51 is soldered.

In FIG. 2, there is a rise of the annular section 20$c$ above the image sensor 51 and at the center of the flange 20$a$ extending in the direction perpendicular to the optical axis from the inner periphery in the vicinity of the bottom end of the enclosure 20. The recessed annular portion on the flange 20$a$ from the periphery of the annular section 20$c$ to the inner periphery of the enclosure 20 forms a receiving section R coated with the adhesive 40 for bonding the IR cut filter CG. The IR cut filter CG is a member formed in an approximately rectangular shape or circular shape and is bonded on the annular section 20$c$.

The imaging lens 10 provided at the center of the enclosure 20 includes a junction type compound lens HBL with a first lens L1, second lens L2 and third lens L3 bonded and fixed in that order as viewed from the object side. The flange portion of the second lens L2 extending in the direction perpendicular to the optical axis abuts the shoulder 20c of the enclosure 20 and is fixed in position. The upper side of the flange section of the second lens L2 is pressed by cover member 21 fixed on the top end of the enclosure 20, and is fixed in position.

Further, the light shield member 23 mounted on the cover member 21 extends around the first lens L1, whereby entry of unwanted light into the enclosure 20 is prevented, and occurrence of ghost or flare is suppressed. The central opening S of the light shield member 23 constitutes the aperture stop.

The image sensor 51 passes through the reflow reservoir (not illustrated) after being integrated into one unit with the enclosure 20 equipped with the IR cut filter CG, imaging lens 10, cover member 21 and light shield member 23. The image sensor 51 is then fixed on the substrate 52 by soldering.

Figure 3:
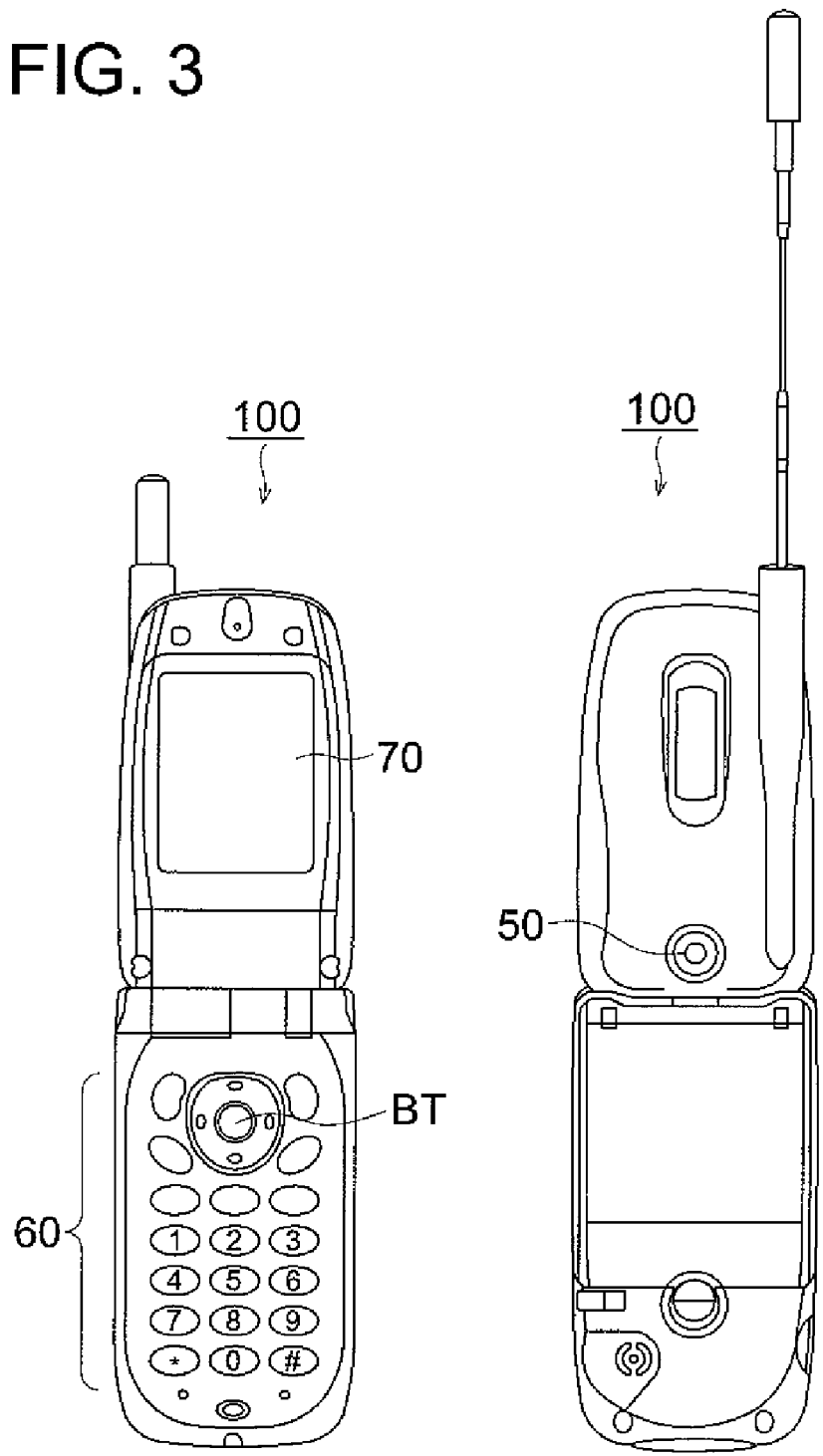
FIG. 3 is a diagram representing that the imaging device 50 is mounted on a cellular mobile telephone 100 as a portable terminal.
Figure 4:
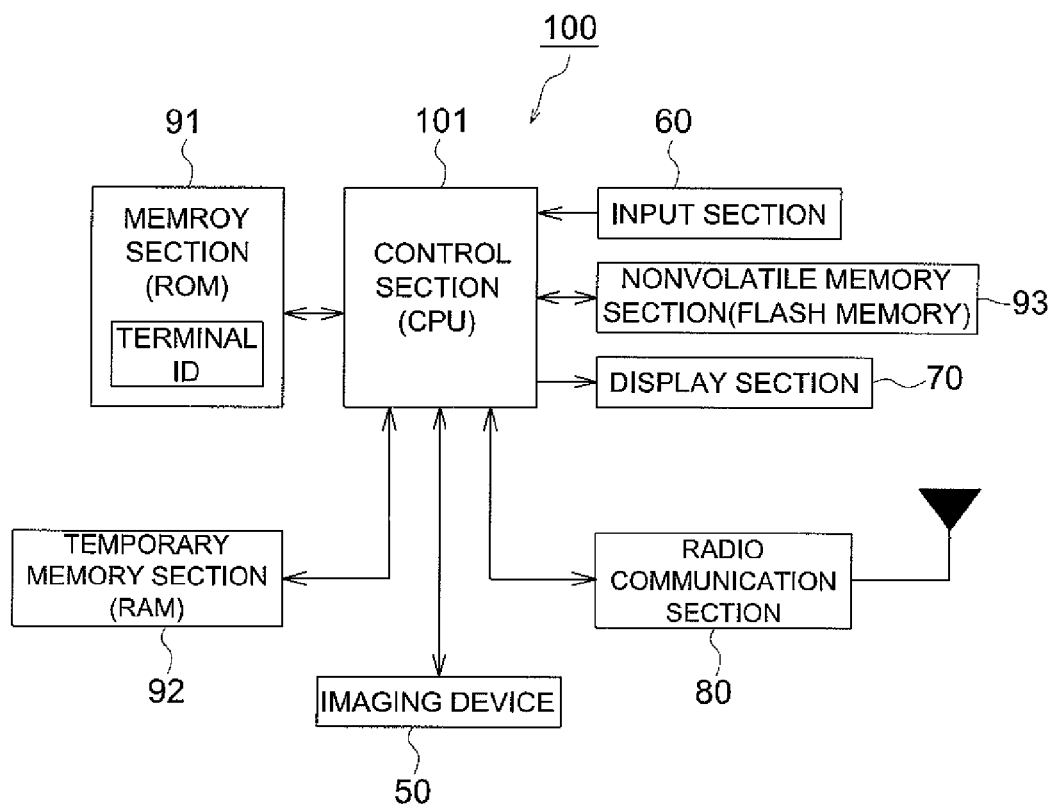
FIG. 4 is a control block diagram showing the cellular mobile telephone 100.

The following describes the pattern of using the imaging device 50. FIG. 3 is a diagram representing that the imaging device 50 is mounted on a cellular mobile telephone 100 as a portable terminal. FIG. 4 is a control block diagram showing the cellular mobile telephone 100.

The imaging device 50 is arranged, for example, in such a way that the end face on the object side of the enclosure 20 in the imaging lens is arranged on the rear of the cellular mobile telephone 100 (wherein the liquid crystal display side is a front surface), and is arranged at the corresponding position below the display section 70.

The external connection terminal (not illustrated) of the imaging device 50 is connected with the control section 101 of the cellular mobile telephone 100, and the image signals such as brightness signal and color difference signal are outputted to the control section 101.

In the meantime, as shown in FIG. 4, the cellular mobile telephone 100 includes:

a control section (CPU) 101 for providing administrative control of each of the components and executing the program in conformity to each processing;

an input section 60 for supporting and entering the numbers and others by keys;

a display section 70 for displaying the captured image and video;

a radio communication section 80 for implementing various forms of information communication with external servers;

a memory section (ROM) 91 for storing the system program of the cellular mobile telephone 100, various forms of programs and required data such as terminal ID;

a temporary memory section (RAM) 92 for temporarily storing various processing programs and data to be executed by the control section 101 and the processing data or imaging data to be executed by the imaging device 50; and a nonvolatile memory section (flash memory) 93 for recording the captured image and video.

When an operator holding the cellular mobile telephone 100 points the imaging lens 10 of the imaging device 50 at the subject, an image signal is captured by the image sensor 51. The operator presses the button BT at a desired shutter chance. Then the shutter is released, and the image is captured into the imaging device 50. The image signal inputted through the imaging device 50 is sent to the control system of the cellular mobile telephone 100, and is stored in the temporary memory section (RAM) 92 or nonvolatile memory section 93. Alternatively, the image signal is displayed on the display section 70, or is further sent to the outside as video information through the radio communication section 80.

Figure 5A:
FIG. 5 is a diagram representing the procedure of manufacturing the junction type compound lens of the imaging lens used in the embodiment of the present invention.
Figure 5A:
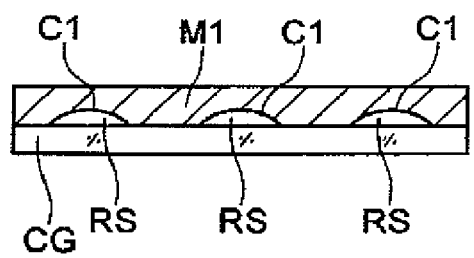

The following describes how to manufacture the junction type compound lens: FIG. 5 is a diagram representing the procedure of manufacturing the junction type compound lens of the imaging lens used in the embodiment of the present invention. As shown in FIG. 5a, the first mold M1 having a plurality of the cavity shapes CG conforming to the aspherical surface shape of the first lens L1 in a matrix array is clamped onto one surface of the parallel flat plate material CG as a large glass-made parallel plate, wherein the alignment marks (not illustrated) provided on both sides are used as reference. The first mold M1 is made of the material that allows passage of ultraviolet rays.

Figure 5B:
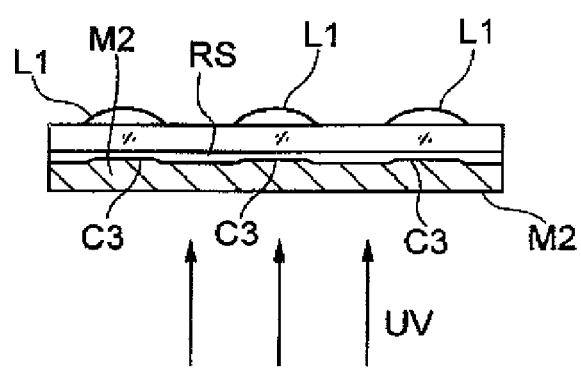

Then the UV curable resin RS is poured between the parallel flat plate material CG and first mold M1 through a runner and gate (not illustrated), and ultraviolet rays are applied from the outside of the first mold M1. The ultraviolet rays having been applied pass through the first mold M1 to cure the UV curable resin RS. After the UV curable resin RS has been cured, the first mold M1 is released, whereby a plurality of first lenses L1 can be fixed and formed on the surface of the parallel flat plate material CG Further, as shown in FIG. 5b, the second mold M2 having a plurality of the cavity shapes C3 conforming to the aspherical surface shape of the third lens L3 in a matrix array is clamped onto the other surface of the parallel flat plate material CG wherein the alignment marks (not illustrated) provided on both sides are used as reference. This procedure provides high-precision positioning of the first mold M1 and second mold M2, and ensures high-precision matching between the optical axes of the first lens L1 and third lens L3. The second mold M2 is also formed of a material permitting passage of ultraviolet rays.

Figure 5C:
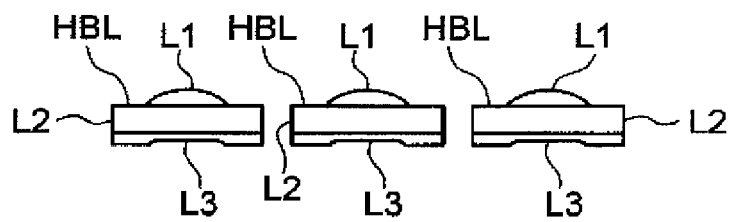

Then the UV curable resin RS is poured between the parallel flat plate material CG and second mold M2 through a runner and gate (not illustrated), and ultraviolet rays are applied from outside of the second mold M2. The ultraviolet rays having been applied pass through the second mold M2 to cure the UV curable resin RS. After the UV curable resin RS has been cured, the second mold M2 is released, whereby a plurality of third lenses L3 can be fixed and formed on the rear surface of the parallel flat plate material CG As shown in FIG. 5c, the parallel flat plate material CG is cut off for each of the first lens L1 and third lens L3, whereby the junction type compound lens HBL is formed. The aforementioned method provides high-volume production of high-precision junction type compound lenses HBL in one operation. It should be noted that thermosetting resin can be used instead of UV curable resin. In this case, to provide the resin with the heat required to cure the resin, the mold itself is heated directly, or heat is given from outside the mold. Thus, the required heat is given to the resin, which is then cured. It is also possible to use the procedure of clamping the first mold M1 and second mold M2 in parallel and to pour the resin into the cavity so that simultaneous curing is achieved. As described above, a plurality of first lenses L1 are molded on one side of the parallel flat plate material CG made of glass, and a plurality of third lens L3 are molded on the other side of the parallel flat plate material CG in conformance to each of a plurality of the first lenses L1. After that, the first lenses L1 and third lenses L3 corresponding thereto are integrated into one set, which is then cut into each set. This procedure produces a plurality of junction type compound lenses HBL in one operation, and hence low-cost junction type compound lenses with suppressed variations in optical performances.

This procedure uses the junction type compound lens HBL formed by bonding the first lens L1 and third lens L3 of cured resins on both sides of the second lens L2 as a glass-made parallel flat plate. Thus, a reduction in optical performances is smaller than that of the plastic lens when exposed to high temperature. This arrangement is more effective in reflow processing and ensures compatibility between the reduced cost and high-volume production of the imaging device 100 incorporating the imaging lens 10, while maintaining or improving the optical performances of the imaging lens 100.

Further, as will be shown with reference to the Examples to be described later, the third lens L3 is designed in such a way that the surface on the object side is plane, while the surface on the image side is convex at the position close to the optical axis and is concave on the periphery within the passing range of a light flux. While reducing other optical aberrations such as distortion, this arrangement allows the portion of the maximum astigmatism to be shifted to the periphery, and increases resolution in the range from the low through intermediate image heights. In addition, this arrangement ensures that the thickness of the third lens L3 does not exhibit much change from the on-axis position to the periphery; with the result that the thickness of the third lens L3 per se can be reduced, and hence a reduction in material cost can be achieved.

EXAMPLE

The following describes the preferred examples for the aforementioned embodiment, without the present invention being restricted thereto. The reference letters used in the example will be given below:

f: Focal distance of the entire imaging lens system
fB: Back focus
F: F-number
2Y: Diagonal length of image surface
r: Paraxial radius of lens surface
D: Distance between lens surfaces
Nd: Refractive index on d-line of lens
vd: Abbe's number on d-line of lens
ENTP: Entrance pupil position
EXTP: Exit pupil position
H1: Principal point position on object side
H2: Principal point position on image side The aspherical shape in the present invention is defined as follows: "x" is expressed by the following formula [Mathematical Formula 2], wherein x is the distance (sag) of the vertex of surface from the tangential plane in the direction of optical axis; y is the height from the optical axis; r is the paraxial radius; K is the conical constant; $A_n$ (=4, 6, 8, ..., 20) is the aspherical coefficient of degree n:

$$x = \frac{y^2/r}{1 + \sqrt{1 - (1+K)y^2/r^2}} + \sum A_n y^n \quad \text{[Mathematical Formula 2]}$$

Example 1

Table 1 shows the lens data in the Example 1. In the following Tables, E (e.g., 2.5E-03) will be used to express the power of 10 (e.g., $2.5 \times 10^{-3}$).

TABLE 1

| f = 1.48 mm | fB = 0.89 mm |
| ENTP = 0.00 mm | EXTP = −1.00 mm |
| F = 2.8 | 2Y = 1.76 mm |

TABLE 1-continued

| H1 = −0.34 mm | | H2 = −0.55 mm | | |
|---|---|---|---|---|
| Surface number | R (mm) | D (mm) | Nd | vd | *1 (mm) |
| 1 (stop) | ∞ | 0.20 | | | 0.27 |
| 2* | 1.043 | 0.18 | 1.53500 | 52.0 | 0.48 |
| 3 | ∞ | 0.40 | 1.52310 | 55.0 | 0.48 |
| 4 | ∞ | 0.12 | 1.53500 | 52.0 | 0.50 |
| 5* | −2.524 | 0.20 | | | 0.51 |
| 6 | ∞ | | | | 0.58 |

| Aspherical surface coefficient | | | |
|---|---|---|---|
| 2nd surface | | 5th surface | |
| K = | −3.0000E+01 | K = | −1.3790E+01 |
| A4 = | 3.4052E+00 | A4 = | 8.4445E−01 |
| A6 = | −2.1290E+01 | A6 = | −2.5681E+00 |
| A8 = | 1.0127E+02 | A8 = | 2.6411E+01 |
| A10 = | −2.6707E+02 | A10 = | −9.7867E+01 |
| A12 = | 2.9546E+02 | A12 = | 1.5434E+02 |

*1; Effective radius

The values for conditional expressions (1) through (4) in the first Example are as follows:

$f_1/f_3 = 0.413$      Conditional expression (1)

$S/f = 0.257$      Conditional expression (2)

$v_1 - v_3 = 0$      Conditional expression (3)

$d_c/f = 0$      Conditional expression (4)

FIG. 6 is a cross section of a first Example, and FIG. 7 is an aberration diagram representing the aberration of the imaging lens in the first Example. FIG. 7*a* shows spherical aberration, FIG. 7*b* indicates astigmatism, and FIG. 7*c* represents distortion.

In the following spherical aberration diagram, the solid line indicates the spherical aberration for the d line ("d" in the diagram), and the broken line indicates the spherical aberration for the line g ("g" in the diagram). In the astigmatism diagram, the solid line shows the sagittal surface ("S" in the diagram), and the broken line indicates the meridional surface ("M" in the diagram).

As shown in FIG. 6, in this Example, the aperture stop S and junction type compound lens HBL are arranged in that order as viewed from the object side. The junction type compound lens HBL has the first lens L1 formed on the object side with respect to the second lens L2 as a parallel flat plate, and the third lens L3 formed on the image side. The surface number 1 of the lens data indicates the aperture stop S. The image side of the third lens L3 is convex on the optical axis, with the peripheral section being concave. This arrangement does not produce much change in the thickness of the third lens L3 between the on-axis position and periphery. In the first Example, as shown in FIG. 7, astigmatism assumes the maximum value at the maximum image height. The astigmatism is reduced in the range of low through intermediate heights.

Example 2

Table 2 shows the lens data in the second Example.

TABLE 2

| f = 1.41 mm | | fB = 0.63 mm | | |
| ENTP = 0.00 mm | | EXTP = −1.24 mm | | |
| F = 2.8 | | 2Y = 1.76 mm | | |
| H1 = −0.38 mm | | H2 = −0.73 mm | | |

| Surface number | R (mm) | D (mm) | Nd | vd | *1 (mm) |
|---|---|---|---|---|---|
| 1 (stop) | ∞ | 0.20 | | | 0.25 |
| 2* | 1.057 | 0.18 | 1.53500 | 52.0 | 0.48 |
| 3 | ∞ | 0.50 | 1.52310 | 55.0 | 0.49 |
| 4 | ∞ | 0.04 | 1.53500 | 52.0 | 0.53 |
| 5* | −2.016 | 0.20 | | | 0.61 |
| 6 | ∞ | 0.30 | 1.51680 | 64.2 | 0.69 |
| 7 | ∞ | | | | |

| Aspherical surface coefficient | | | |
|---|---|---|---|
| 2nd surface | | 5th surface | |
| K = | −7.1129E+00 | K = | −4.8465E+00 |
| A4 = | 1.1602E+00 | A4 = | 7.2316E−01 |
| A6 = | 1.8143E+00 | A6 = | −4.9278E−01 |
| A8 = | −4.6744E+01 | A8 = | 7.5737E+00 |
| A10 = | 2.3359E+02 | A10 = | −1.7379E+01 |
| A12 = | −3.8037E+02 | A12 = | 2.0851E+01 |

*1; Effective radius

The values for conditional expressions (1) through (4) in the second Example are as follows:

$f_1/f_3 = 0.524$      Conditional expression (1)

$S/f = 0.268$      Conditional expression (2)

$v_1 - v_3 = 0$      Conditional expression (3)

$d_e/f = 0.213$      Conditional expression (4)

Figure 8:
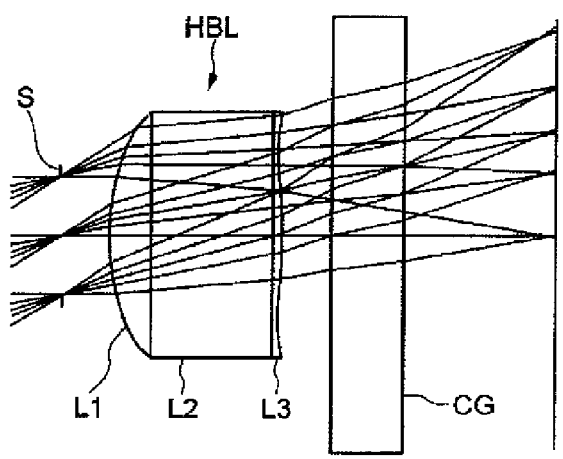
FIG. 8 is a cross section of a second Example.
Figure 9A:
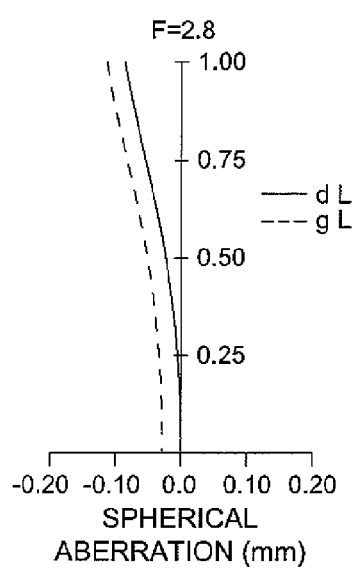
FIG. 9 is an aberration diagram representing the spherical aberration (a), astigmatism (b) and distortion (c) of the imaging lens in the second Example.
Figure 9B:
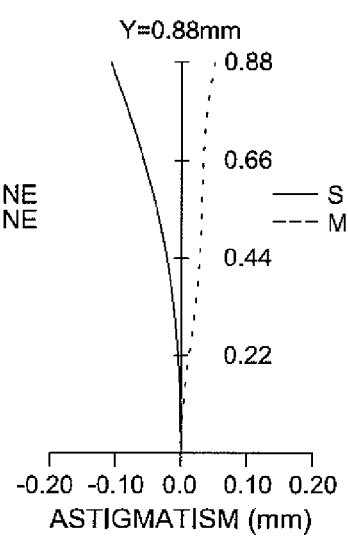
Figure 9C:
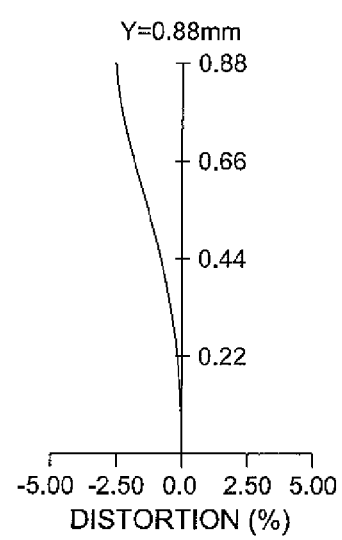

FIG. 8 is a cross section of a second Example. FIG. 9 is an aberration diagram for the imaging lens in the second Example. FIG. 9a is a diagram representing the spherical aberration, FIG. 9b is a diagram representing the astigmatism and FIG. 9c is a diagram representing the distortion.

As shown in FIG. 8, the aperture stop S, junction type compound lens HBL, and parallel flat plate element CG are arranged in that order, as viewed from the object side, in this Example. The junction type compound lens HBL has the first lens L1 formed on the object side and the third lens L3 on the image side, with respect to the second lens L2 as a parallel flat plate. Similarly to the case of the first Example, the surface of the third lens L3 on the image side is convex on the optical axis and concave on the periphery. This arrangement does not produce much change in the thickness of the third lens L3 between the on-axis position and periphery. In this Example, the distance between the aperture stop S and second lens L2 is greater than that in Example 1. As will be apparent from the aberration diagram of FIG. 9, astigmatism is reduced in the range of low through intermediate image heights, similarly to the case of Example 1.

Example 3

Table 3 shows the lens data in the third Example.

TABLE 3

| f = 1.46 mm | | fB = 0.55 mm | | |
| ENTP = 0.00 mm | | EXTP = −1.02 mm | | |
| F = 2.8 | | 2Y = 1.685 mm | | |
| H1 = −0.13 mm | | H2 = −0.87 mm | | |

| Surface number | R (mm) | D (mm) | Nd | vd | *1 (mm) |
|---|---|---|---|---|---|
| 1 (stop) | ∞ | 0.08 | | | 0.26 |
| 2* | 0.929 | 0.08 | 1.57370 | 29.0 | 0.34 |
| 3 | ∞ | 0.52 | 1.65040 | 59.4 | 0.34 |
| 4 | ∞ | 0.08 | 1.57370 | 29.0 | 0.40 |
| 5* | −6.463 | 0.16 | | | 0.42 |
| 6 | ∞ | 0.50 | 1.51680 | 64.2 | 0.49 |
| 7 | ∞ | | | | 0.65 |

| Aspherical surface coefficient | | | |
|---|---|---|---|
| 2nd surface | | 5th surface | |
| K = | 4.9179E+00 | K = | −4.8000E+02 |
| A4 = | −6.2160E−01 | A4 = | 8.3206E−01 |
| A6 = | 9.7587E+00 | A6 = | 1.1917E−01 |
| A8 = | −1.8666E+02 | A8 = | 5.7674E+00 |
| A10 = | 8.6212E+02 | A10 = | 1.7335E+01 |
| A12 = | −3.3169E+03 | A12 = | −1.3056E+02 |

*1; Effective radius

The values for conditional expressions (1) through (4) in the third Example are as follows:

$f_1/f_3 = 0.144$      Conditional expression (1)

$S/f = 0.109$      Conditional expression (2)

$v_1 - v_3 = 0$      Conditional expression (3)

$d_e/f = 0.342$      Conditional expression (4)

Figure 10:
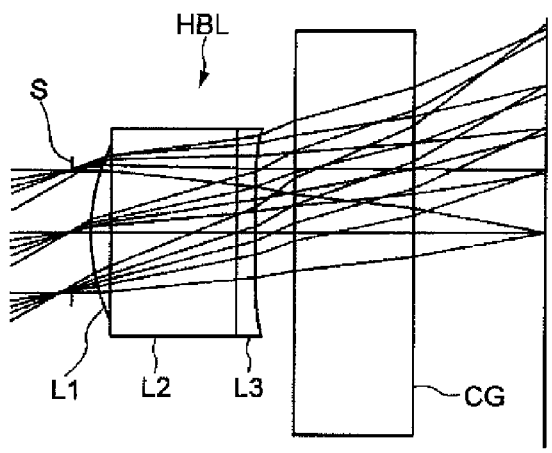
FIG. 10 is a cross section of a third Example.
Figure 11A:
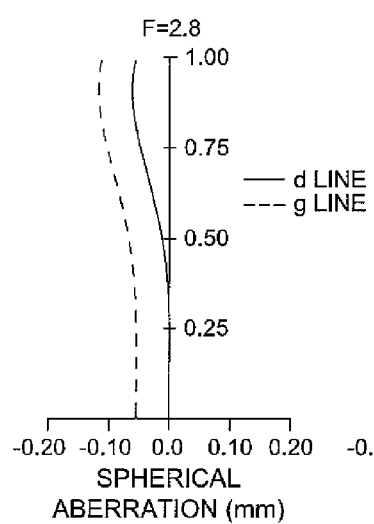
FIG. 11 is an aberration diagram representing the spherical aberration (a), astigmatism (b) and distortion (c) of the imaging lens in the third Example.
Figure 11B:
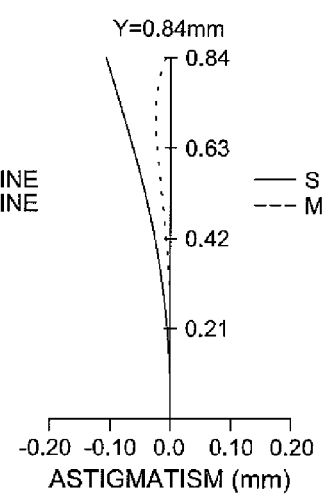
Figure 11C:
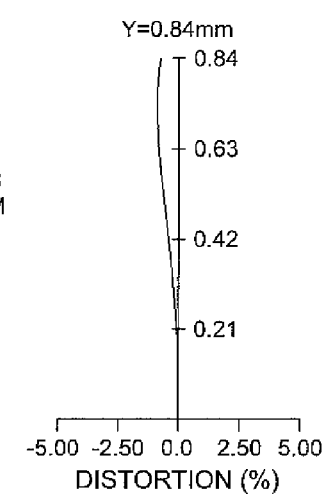

FIG. 10 is a cross section of the third Example. FIG. 11 is an aberration diagram for the imaging lens in the third Example. FIG. 11a shows the spherical aberration, FIG. 11b shows the astigmatism, and FIG. 11e shows the distortion.

As shown in FIG. 10, similarly to the case of the second Example, the aperture stop S, junction type compound lens HBL, and parallel flat plate element CG are arranged in that order, as viewed from the object side, in this Example. The junction type compound lens HBL has the first lens L1 formed on the object side and the third lens L3 on the image side, with respect to the second lens L2 as a parallel flat plate. Similarly to the case of the first and second Examples, the surface of the third lens L3 on the image side is convex on the optical axis and concave on the periphery. In this Example, the power of the first lens L1 is intensified, and the distance between the aperture stop S and second lens L2 is reduced.

Example 4

Table 4 shows the lens data in the fourth Example.

TABLE 4

| f = 1.48 mm | | fB = 0.89 mm | | |
| ENTP = 0.00 mm | | EXTP = −0.99 mm | | |
| F = 2.8 | | 2Y = 1.76 mm | | |
| H1 = −0.34 mm | | H2 = −0.55 mm | | |

| Surface number | R (mm) | D (mm) | Nd | vd | *1 (mm) |
|---|---|---|---|---|---|

TABLE 4-continued

| | | | | | |
|---|---|---|---|---|---|
| 1 (stop) | ∞ | 0.20 | | | 0.27 |
| 2* | 1.042 | 0.18 | 1.53500 | 52.0 | 0.48 |
| 3 | ∞ | 0.40 | 1.52310 | 55.0 | 0.48 |
| 4 | ∞ | 0.12 | 1.59400 | 30.0 | 0.50 |
| 5* | −2.821 | 0.20 | | | 0.51 |
| 6 | ∞ | | | | 0.58 |

Aspherical surface coefficient

| 2nd surface | | 5th surface | |
|---|---|---|---|
| K = | −3.0000E+01 | K = | −9.3162E+01 |
| A4 = | 3.4270E+00 | A4 = | 8.6441E−01 |
| A6 = | −2.1428E+01 | A6 = | −2.4816E+00 |
| A8 = | 1.0161E+02 | A8 = | 2.4262E+01 |
| A10 = | −2.6592E+02 | A10 = | −8.9129E+01 |
| A12 = | 2.9121E+02 | A12 = | 1.4191E+02 |

*1; Effective radius

The values for conditional expressions (1) through (4) in the fourth Example are as follows:

$f_1/f_3 = 0.410$         Conditional expression (1)

$S/f = 0.257$         Conditional expression (2)

$v_1 - v_3 = 22.0$         Conditional expression (3)

$d_c/f = 0$         Conditional expression (4)

Figure 12:
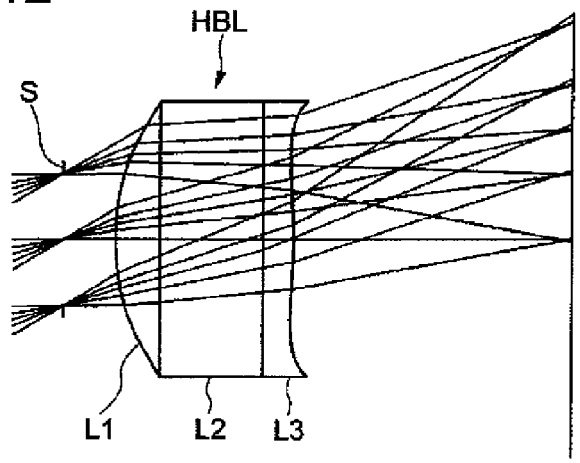
FIG. 12 is a cross section of a fourth Example.
Figure 13A:
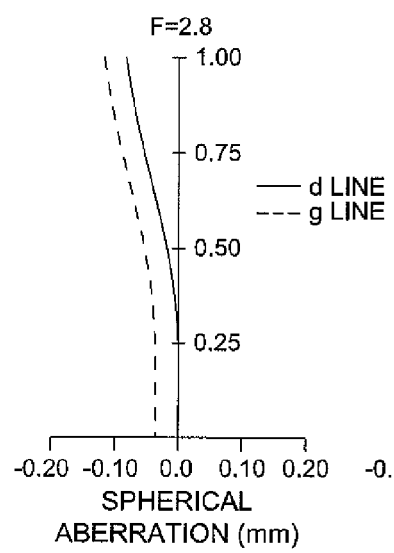
FIG. 13 is an aberration diagram representing the spherical aberration (a), astigmatism (b) and distortion (c) of the imaging lens in the fourth Example.
Figure 13B:
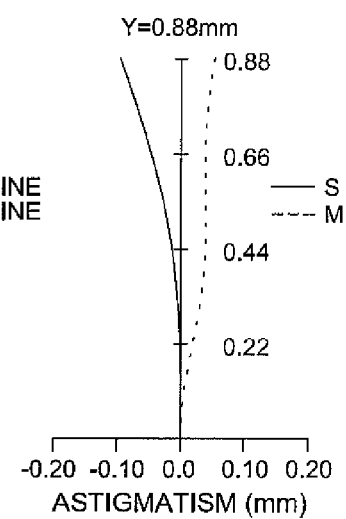
Figure 13C:
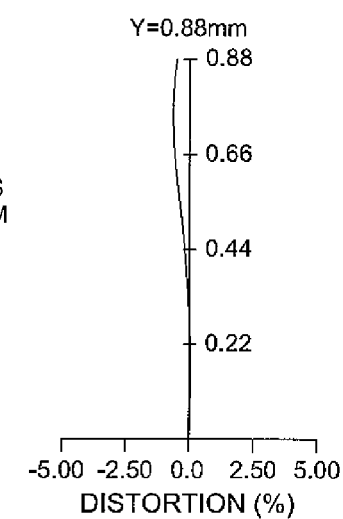

FIG. 12 is a cross section of the fourth Example. FIG. 13 is an aberration diagram for the imaging lens in the fourth Example. FIG. 13a shows the spherical aberration, FIG. 13b shows the astigmatism, and FIG. 13c shows the distortion.

As shown in FIG. 12, similarly to the case of the first Example, the aperture stop S and junction type compound lens HBL are arranged in that order, as viewed from the object side. The junction type compound lens HBL has the first lens L1 formed on the object side and the third lens L3 on the image side, with respect to the second lens L2 as a parallel flat plate. Similarly to the case of the first through third Examples, the surface of the third lens L3 on the image side is convex on the optical axis and concave on the periphery. In this Example, the third lens L3 is made of a high-dispersion material, in contrast to the first Example. $v_1 > v_3$ is satisfied.

Figure 14A:
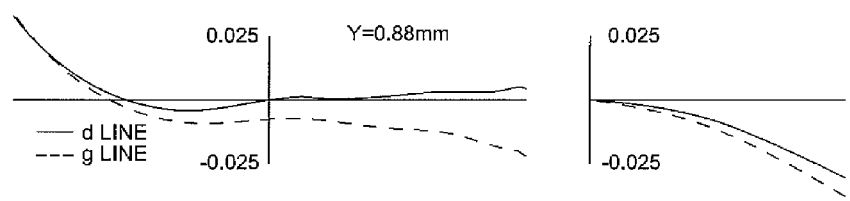
FIG. 14 is a diagram representing the aberration on the optical axis (b) and at the maximum image height (a) in the first Example.
Figure 14B:
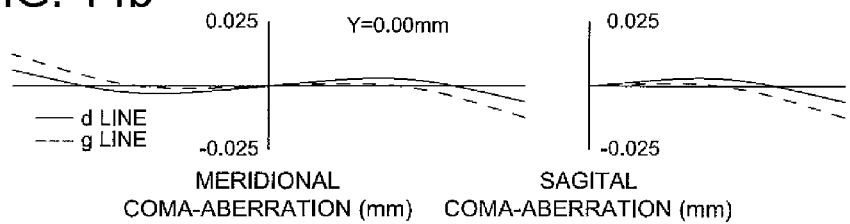
Figure 15A:
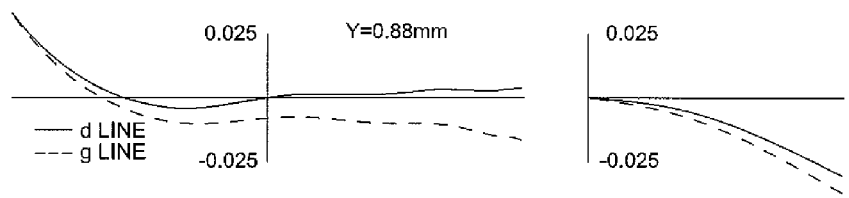
FIG. 15 is a diagram representing the aberration on the optical axis (b) and at the maximum image height (a) in the fourth Example.
Figure 15B:
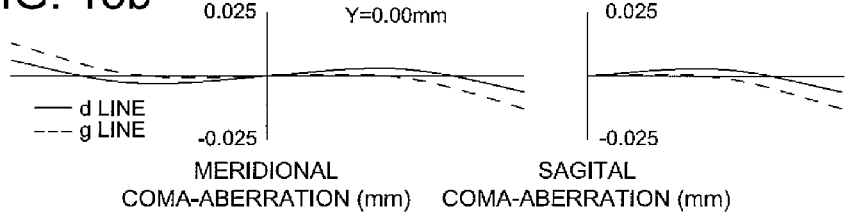

FIG. 14 is a diagram representing the aberration on the optical axis (b) and at the maximum image height (a) in the first Example. FIG. 15 is a diagram representing the aberration on the optical axis (b) and at the maximum image height (a) in the fourth Example. In FIGS. 14 and 15, the left diagrams show the meridional coma-aberration, and the right diagrams indicate the sagittal coma-aberration. As will be clear from the comparison between FIGS. 14 and 15, in the fourth Example, an increase in the on-axis color aberration is gradually reduced in contrast to the first Example. This demonstrates effective correction of the curvature on the color image surface.

Example 5

Table 5 shows the lens data in the fifth Example.

TABLE 5

| f = 1.34 mm | fB = 0.33 mm |
|---|---|
| ENTP = 0.00 mm | EXTP = −1.23 mm |
| F = 4.0 | 2Y = 1.758 mm |
| H1 = −0.17 mm | H2 = −1.03 mm |

| Surface number | R (mm) | D (mm) | Nd | vd | *1 (mm) |
|---|---|---|---|---|---|
| 1 (stop) | ∞ | 0.11 | | | 0.17 |
| 2* | 0.867 | 0.17 | 1.57370 | 29.0 | 0.27 |
| 3 | ∞ | 0.30 | 1.52470 | 56.2 | 0.30 |
| 4 | ∞ | 0.12 | 1.57370 | 29.0 | 0.36 |
| 5* | −4.921 | 0.10 | | | 0.39 |
| 6 | ∞ | 0.90 | 1.51630 | 64.1 | 0.44 |
| 7 | ∞ | | | | 0.76 |

Aspherical surface coefficient

| 2nd surface | | 5th surface | |
|---|---|---|---|
| K = | −1.0000E+00 | K = | −1.0000E+00 |
| A4 = | −6.5906E−01 | A4 = | 2.4687E+00 |
| A6 = | 4.9972E+01 | A6 = | −1.8819E+01 |
| A8 = | −7.0581E+02 | A8 = | 1.3436E+02 |
| A10 = | 3.1582E+03 | A10 = | −3.2081E+02 |

*1; Effective radius

The values for conditional expressions (1) through (4) in the fifth Example are as follows:

$f_1/f_3 = 0.176$         Conditional expression (1)

$S/f = 0.214$         Conditional expression (2)

$v_1 - v_3 = 0$         Conditional expression (3)

$d_c/f = 0.674$         Conditional expression (4)

Figure 16:
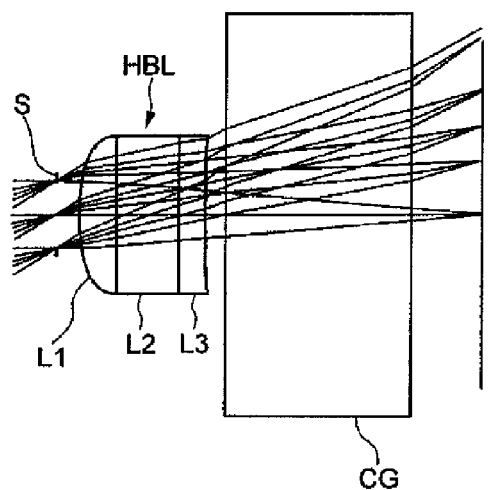
FIG. 16 is a cross section of a fifth Example.
Figures 17A, 17B, 17C:
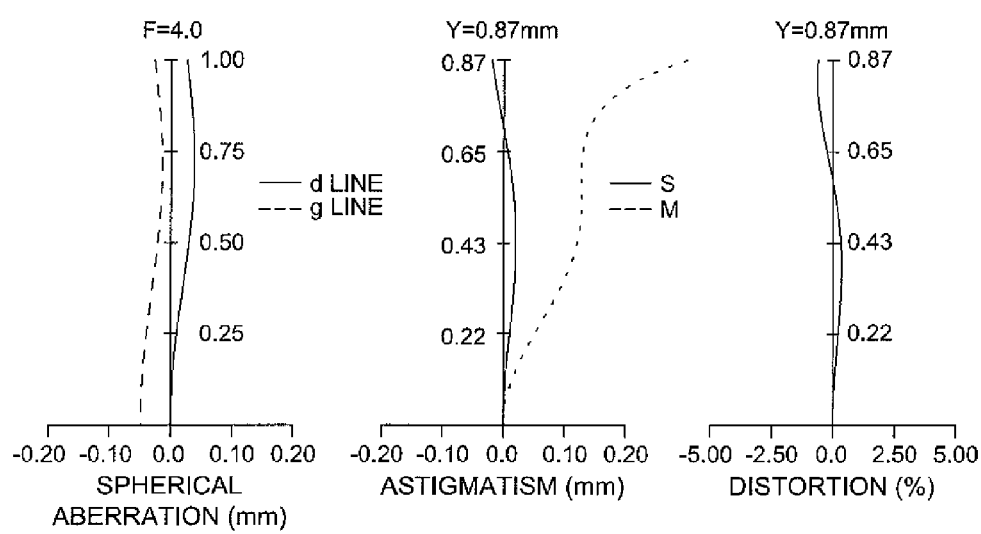
FIG. 17 is an aberration diagram representing the spherical aberration (a), astigmatism (b) and distortion (c) of the imaging lens in the fifth Example.

FIG. 16 is a cross section of the fifth Example. FIG. 17 is an aberration diagram for the imaging lens in the fifth Example. FIG. 17a shows the spherical aberration, FIG. 17b shows the astigmatism, and FIG. 17c shows the distortion.

As shown in FIG. 16, similarly to the case of the second and third Example, the aperture stop S, junction type compound lens HBL, and parallel flat plate element CG are arranged in that order, as viewed from the object side, in this Example. The junction type compound lens HBL has the first lens L1 formed on the object side and the third lens L3 on the image side, with respect to the second lens L2 as a parallel flat plate. Similarly to the case of the first through fourth Examples, the surface of the third lens L3 on the image side is convex on the optical axis and concave on the periphery. In this Example, the thickness of the parallel flat plate element CG immediately before the image surface is increased. Thus, as will be apparent from the aberration diagram of FIG. 17, the curvature of the sagittal image surface is corrected.

Example 6

Table 6 shows the lens data in the sixth Example.

TABLE 6

| f = 1.39 mm | fB = 0.28 mm |
|---|---|
| ENTP = 0.00 mm | EXTP = −1.85 mm |
| F = 2.8 | 2Y = 1.76 mm |
| H1 = −0.50 mm | H2 = −1.06 mm |

| Surface number | R (mm) | D (mm) | Nd | vd | *1 (mm) |
|---|---|---|---|---|---|
| 1 (stop) | ∞ | 0.15 | | | 0.25 |
| 2* | 1.122 | 0.14 | 1.53500 | 52.0 | 0.41 |
| 3 | ∞ | 0.30 | 1.52310 | 55.0 | 0.42 |
| 4 | ∞ | 0.16 | 1.53500 | 52.0 | 0.48 |
| 5* | −1.614 | 0.10 | | | 0.48 |
| 6* | −2.318 | 0.15 | 1.53500 | 52.0 | 0.51 |
| 7 | ∞ | 0.30 | 1.52310 | 55.0 | 0.55 |
| 8 | ∞ | 0.13 | 1.53500 | 52.0 | 0.62 |

TABLE 6-continued

| | | | | | |
|---|---|---|---|---|---|
| 9* | −1.929 | 0.20 | | | 0.63 |
| 10 | ∞ | 0.30 | 1.51680 | 64.2 | 0.73 |
| 11 | ∞ | | | | 0.80 |

Aspherical surface coefficient

| 2nd surface | | 6th surface | |
|---|---|---|---|
| K = | −1.0000E+00 | K = | −2.8040E+01 |
| A4 = | 4.4533E−01 | A4 = | 2.1546E−01 |
| A6 = | 6.3425E+00 | A6 = | −1.3634E+00 |
| A8 = | −1.1229E+02 | A8 = | 3.9390E+00 |
| A10 = | 6.7800E+02 | A10 = | −2.3514E+00 |
| A12 = | −1.3948E+03 | A12 = | −3.6273E+00 |

| 5th surface | | 9th surface | |
|---|---|---|---|
| K = | −2.1424E+01 | K = | −4.4878E+00 |
| A4 = | 1.7848E−01 | A4 = | 2.9512E−01 |
| A6 = | −6.8483E−01 | A6 = | 1.9513E−01 |
| A8 = | 1.8505E+01 | A8 = | −8.8842E−01 |
| A10 = | −7.5904E+01 | A10 = | 1.3470E−01 |
| A12 = | 1.1515E+02 | A12 = | 2.1264E+00 |

*1; Effective radius

The values for conditional expressions (1) through (4) in the sixth Example are as follows:

$f_1/f_3=0.695$  Conditional expression (1)

$S/f=0.210$  Conditional expression (2)

$v_1-v_3=0$  Conditional expression (3)

$d_c/f=0.216$  Conditional expression (4)

Figure 18:
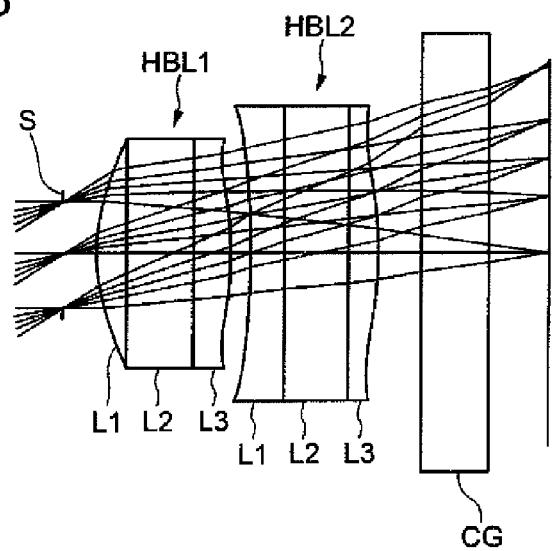
FIG. 18 is a cross section of a sixth Example.
Figure 19A:
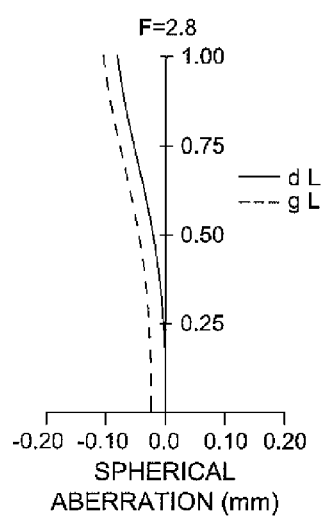
FIG. 19 is an aberration diagram representing the spherical aberration (a), astigmatism (b) and distortion (c) of the imaging lens in the sixth Example.
Figure 19B:
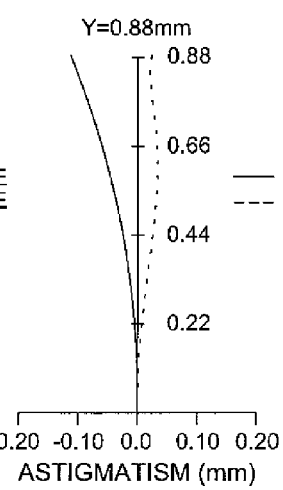
Figure 19C:
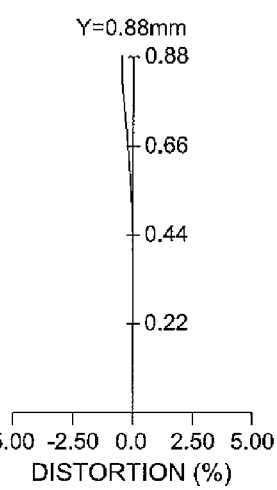

FIG. 18 is a cross section of the sixth Example. FIG. 19 is an aberration diagram for the imaging lens in the sixth Example. FIG. 19a shows the spherical aberration, FIG. 19b shows the astigmatism, and FIG. 19c shows the distortion.

As shown in FIG. 18, the aperture stop S, first junction type compound lens HBL1, second junction type compound lens HBL2, and parallel flat plate element CG are arranged in that order, as viewed from the object side, in this Example. Each of the junction type compound lenses HBL1 and HBL2 has the first lens L1 formed on the object side and the third lens L3 on the image side, with respect to the second lens L2 as a parallel flat plate. Similarly to the case of the first through fifth Examples, of the first junction type compound lens HBL1 as the lens located on the side closest to the object, the surface of the third lens L3 on the image side is convex on the optical axis and concave on the periphery. In this Example, one or more second junction type compound lenses HBL2 are arranged closer to the image side than the first junction type compound lens HBL1. As indicated in the aberration diagram of FIG. 19, distortion is satisfactorily corrected by the effect of the second junction type compound lens HBL2.

Example 7

Table 7 shows the lens data in the seventh Example.

TABLE 7

| f = 1.48 mm | fB = 0.10 mm |
|---|---|
| ENTP = 0.00 mm | EXTP = −1.65 mm |
| F = 2.8 | 2Y = 1.76 mm |
| H1 = −0.26 mm | H2 = −1.34 mm |

| Surface number | R (mm) | D (mm) | Nd | vd | *1 (mm) |
|---|---|---|---|---|---|
| 1 (stop) | ∞ | 0.15 | | | 0.27 |
| 2* | 0.955 | 0.20 | 1.53500 | 52.0 | 0.44 |
| 3 | ∞ | 0.50 | 1.52310 | 55.0 | 0.45 |
| 4 | ∞ | 0.20 | 1.53500 | 52.0 | 0.50 |
| 5* | −1.614 | 0.20 | | | 0.52 |
| 6* | −2.134 | 0.50 | 1.52310 | 55.0 | 0.56 |
| 7* | −9.063 | 0.10 | | | 0.78 |
| 8 | ∞ | 0.30 | 1.51680 | 64.2 | 0.84 |
| 9 | ∞ | | | | 0.91 |

Aspherical surface coefficient

| 2nd surface | | 6th surface | |
|---|---|---|---|
| K = | −1.2246E+00 | K = | −5.5009E−01 |
| A4 = | 3.0881E−01 | A4 = | 6.9489E−01 |
| A6 = | 6.9933E+00 | A6 = | −9.8908E+00 |
| A8 = | −1.0430E+02 | A8 = | 5.6800E+01 |
| A10 = | 5.7819E+02 | A10 = | −1.5921E+02 |
| A12 = | −1.1110E+03 | A12 = | 1.5275E+02 |

| 5th surface | | 7th surface | |
|---|---|---|---|
| K = | −2.1424E+01 | K = | −3.0000E+01 |
| A4 = | 1.7848E−01 | A4 = | 4.4086E−01 |
| A6 = | −6.8483E−01 | A6 = | −3.0087E+00 |
| A8 = | 1.8505E+01 | A8 = | 9.5932E+00 |
| A10 = | −7.5904E+01 | A10 = | −1.4905E+01 |
| A12 = | 1.1515E+02 | A12 = | 8.1268E+00 |

*1; Effective radius

The values for conditional expressions (1) through (4) in the seventh Example are as follows:

$f_1/f_3=0.592$  Conditional expression (1)

$S/f=0.236$  Conditional expression (2)

$v_1-v_3=0$  Conditional expression (3)

$d_c/f=0.202$  Conditional expression (4)

Figure 20:
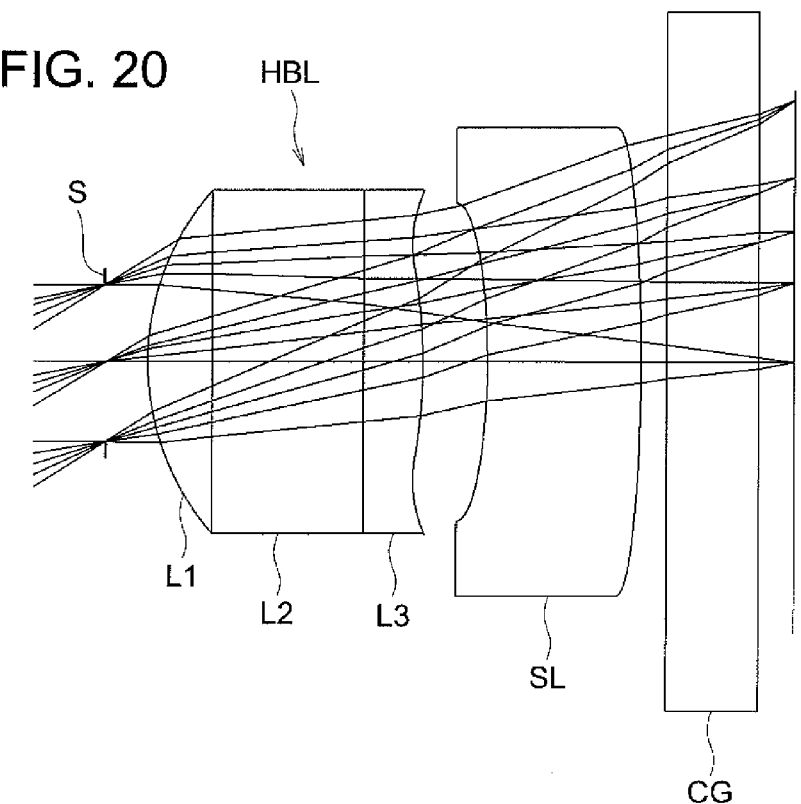
FIG. 20 is a cross section of a seventh Example.
Figure 21A:
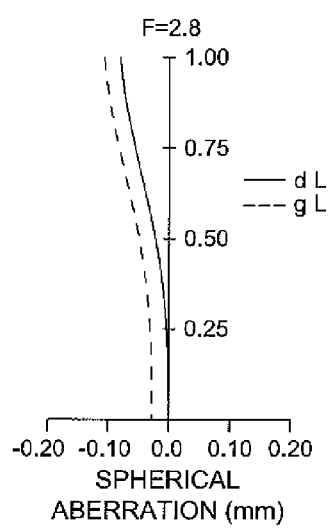
FIG. 21 is an aberration diagram representing the spherical aberration (a), astigmatism (b) and distortion (c) of the imaging lens in the seventh Example.
Figure 21B:
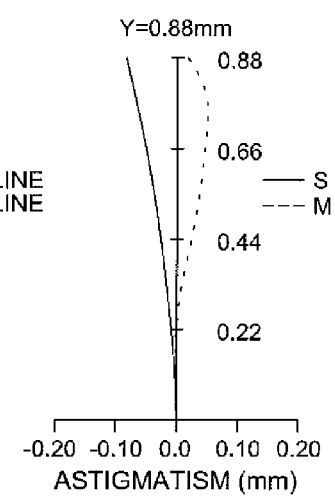
Figure 21C:
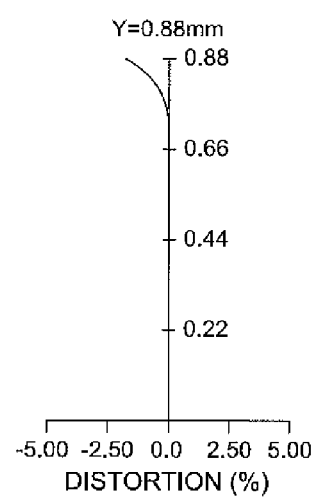

FIG. 20 is a cross section of the seventh Example. FIG. 21 is an aberration diagram for the imaging lens in the seventh Example. FIG. 21a shows the spherical aberration, FIG. 21b shows the astigmatism, and FIG. 21c shows the distortion.

As shown in FIG. 20, the aperture stop 5, junction type compound lens HBL, single lens SL and parallel flat plate element CG are arranged in that order, as viewed from the object side, in this Example. The junction type compound lens HBL has the first lens L1 formed on the object side and the third lens L3 on the image side, with respect to the second lens L2 as a parallel flat plate. Similarly to the case of the first through sixth Examples, the surface of the third lens L3 on the image side is convex on the optical axis and concave on the periphery. In this Example, one or more single lenses SL are arranged closer to the image side than the junction type compound lens HBL. As indicated in the aberration diagram of FIG. 21, distortion is satisfactorily corrected by the effect of the single lens SL.

Comparative Example

The following gives the overall specifications and conditional expressions in the Comparative Example. This Comparative Example is taken from the Example 1 of the Patent Literature 1. Similarly to the case of imaging lens in the present Example, one composite lens formed by bonding a curing resin on both surfaces of the glass material as the parallel flat plate is utilized.

The overall specifications and conditional expressions (1) through (4) in the Comparative Example are as Follows
f=1.001 mm, F=2.8, 2Y=1.35 mm

| | |
|---|---|
| $f_1/f_3 = 1.28$ | Conditional expression (1) |
| $S/f = 0.09$ | Conditional expression (2) |
| $v_1 - v_3 = 0$ | Conditional expression (3) |
| $d_c/f = 0.28$ | Conditional expression (4) |

Figure 22:
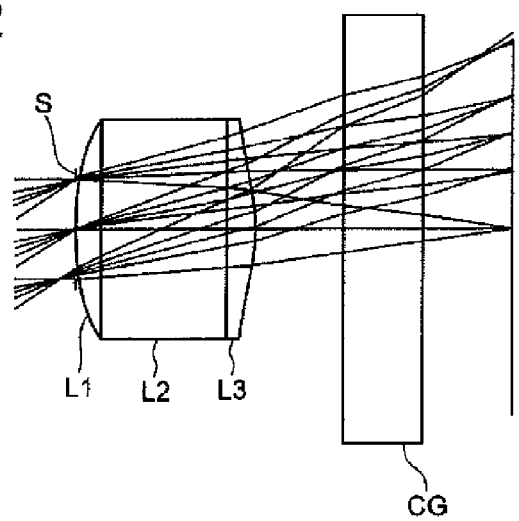
FIG. 22 is a cross section of a Comparative Example.
Figure 23A:
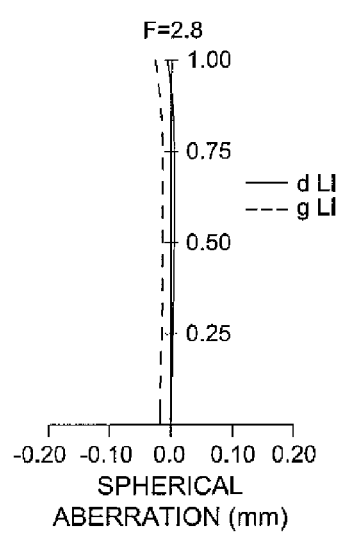
FIG. 23 is an aberration diagram representing the spherical aberration (a), astigmatism (b) and distortion (c) of the imaging lens in the Comparative Example.
Figure 23B:
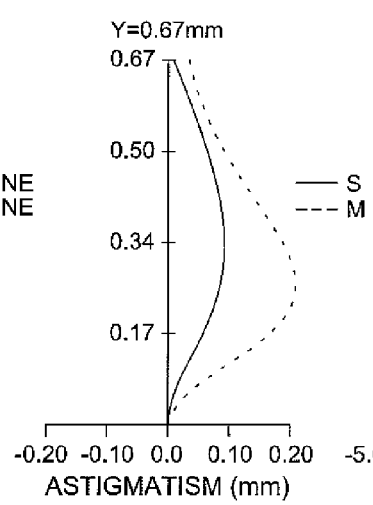
Figure 23C:
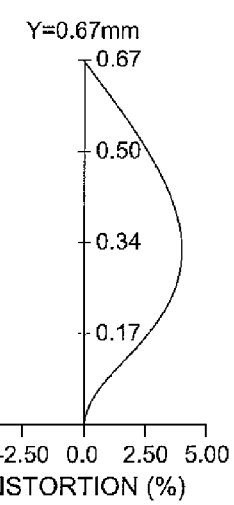

FIG. 22 is a cross section of a Comparative Example. FIG. 23 is an aberration diagram for the imaging lens in the Comparative Example. FIG. 23a is a spherical aberration diagram, FIG. 23b is a spherical astigmatism diagram, and FIG. 23c is a distortion diagram.

As will be apparent from FIG. 23, in the Comparative Example, the surface of the third lens on the image side is convex over all the traveling range of the light flux from the optical axis to the periphery. Compared with the aforementioned Examples, the aberration is increased in the range of low through intermediate image heights and the high-quality image cannot be obtained.

What is claimed is:

1. An imaging lens consisting of: an aperture stop and a junction type compound lens wherein:
   - a lens located on a side closest to an object is the junction type compound lens;
   - the junction type compound lens comprising a first lens, a second and a third lens arranged in that order in a direction from the object side towards an image side;
   - the second lens has both the surfaces on the object side and on the image side being made of flat-glass parallel plates;
   - the first and third lenses are formed of curing resin;
   - the first and second lenses are directly or indirectly bonded, the second and third lenses being also directly or indirectly bonded;
   - the first lens is a plano-convex lens wherein the surface on the object side is a convex aspherical surface and the surface on the image side is a plane surface; and
   - the third lens is aspherical in such a way that the surface on the object side is plane, while the surface thereof on the image side is convex at the position close to the optical axis and is concave on the periphery within the passing range of a light flux.

2. The imaging lens of claim 1, wherein the following conditional expression is satisfied:

$$f_1/f_3 < 1.2 \tag{1}$$

wherein $f_1$ indicates a focal distance of the first lens and $f_3$ denotes a focal distance of the third lens.

3. The imaging lens of claim 1, wherein the following conditional expression is satisfied:

$$0.1 \leq S/f \leq 0.3 \tag{2}$$

wherein S is a distance between the surface of the second lens on the object side and the aperture stop, and f is the focal distance of the entire imaging lens system.

4. The imaging lens of claim 1, wherein the following conditional expression is satisfied:

$$v_1 > v_3 \tag{3}$$

wherein $v_1$ is an Abbe's number of d-line of the first lens, and $v_3$ is an Abbe's number of d-line of the third lens.

5. The imaging lens of claim 1, wherein the junction type compound lens is manufactured by mounting a plurality of sets of the first and third lenses on a glass-made parallel flat plate material and cutting the same into each set.

6. An imaging device comprising:
   the imaging lens of claim 1; and
   a solid image pickup element that converts into electric signals the subject image formed by the imaging lens.

7. The imaging device of claim 6, wherein the imaging device has a parallel flat plate element between the imaging lens and the solid image pickup element, and the following conditional expression is satisfied:

$$0 < d_c/f \leq 0.7 \tag{4}$$

wherein $d_c$ is a thickness of the parallel flat plate element and f is a focal distance of the entire imaging lens system.

8. A portable terminal comprising the imaging device of claim 6.

* * * * *